(12) United States Patent
Reisner et al.

(10) Patent No.: US 8,943,534 B2
(45) Date of Patent: Jan. 27, 2015

(54) ADVANCED STREAMING PLAYBACK/DYNAMIC AD INSERTION

(71) Applicants: Samuel Joseph Reisner, Burbank, CA (US); Adam Meikle, Burbank, CA (US)

(72) Inventors: Samuel Joseph Reisner, Burbank, CA (US); Adam Meikle, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 59 days.

(21) Appl. No.: 13/898,003

(22) Filed: May 20, 2013

(65) Prior Publication Data

US 2014/0344852 A1 Nov. 20, 2014

(51) Int. Cl.
*H04N 7/10* (2006.01)
*H04N 7/025* (2006.01)
*H04N 21/2668* (2011.01)
*H04N 21/61* (2011.01)
*H04N 21/81* (2011.01)

(52) U.S. Cl.
CPC ....... *H04N 21/2668* (2013.01); *H04N 21/6125* (2013.01); *H04N 21/812* (2013.01)
USPC ............................................. 725/32; 725/36

(58) Field of Classification Search
CPC .......... H04N 21/812; H04N 21/23424; H04N 21/44016; H04N 21/2668; H04N 21/6125
USPC ............................................. 726/32, 34–36
See application file for complete search history.

(56) References Cited

U.S. PATENT DOCUMENTS

| | | | |
|---|---|---|---|
| 5,886,731 A * | 3/1999 | Ebisawa ........................ | 725/32 |
| 6,704,930 B1 * | 3/2004 | Eldering et al. .............. | 725/36 |
| 2003/0149975 A1 | 8/2003 | Eldering et al. | |
| 2008/0307454 A1 | 12/2008 | Ahanger et al. | |
| 2011/0138020 A1 | 6/2011 | Pantos et al. | |
| 2011/0246661 A1 | 10/2011 | Manzari et al. | |

* cited by examiner

*Primary Examiner* — Hai V Tran
(74) *Attorney, Agent, or Firm* — Buckley, Maschoff & Talwalkar LLC

(57) ABSTRACT

According to some embodiments, systems, methods, apparatus, and computer program code are provided to process video source data to insert ad or other content into a video stream for distribution to client devices.

14 Claims, 18 Drawing Sheets

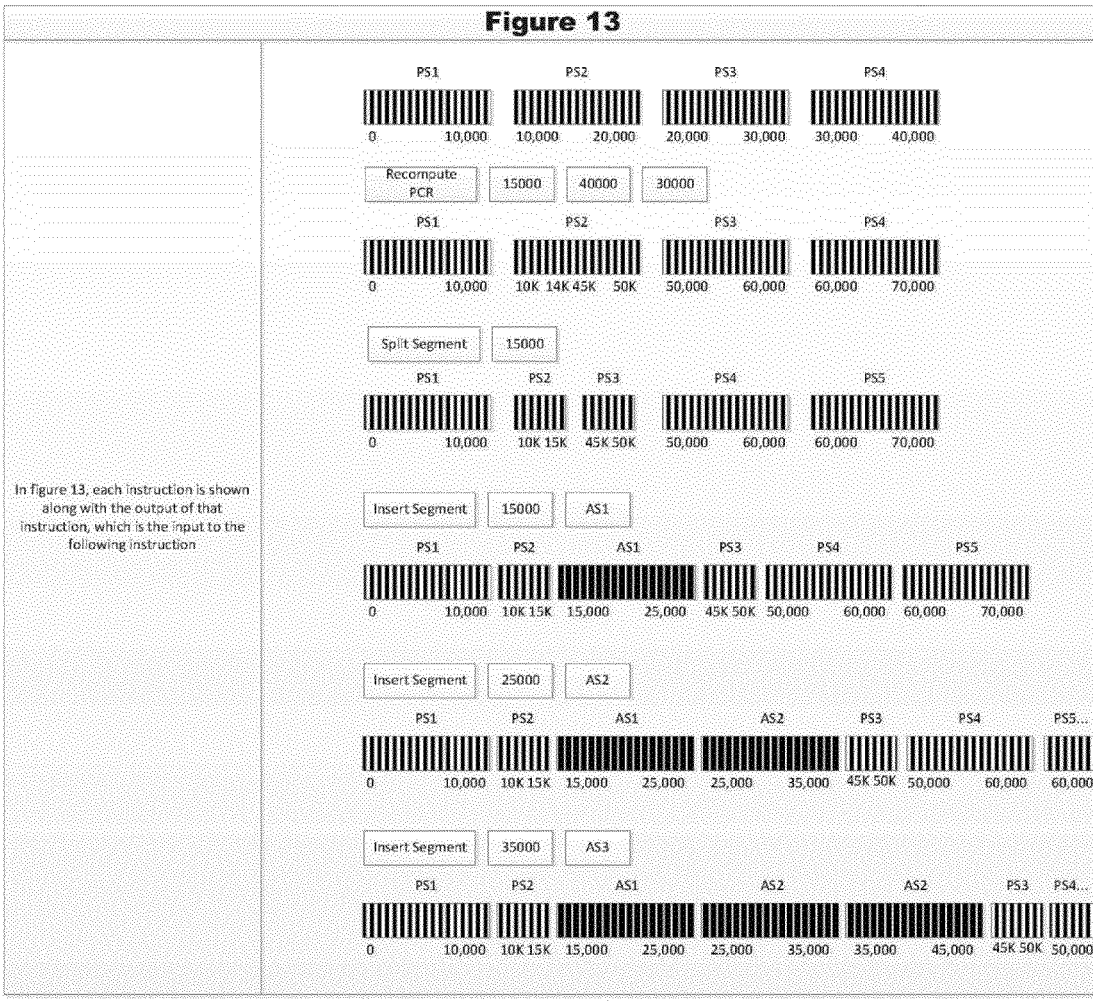

ADVANCED STREAMING PLAYBACK/DYNAMIC AD INSERTION

FIELD

The present invention relates to systems and methods for streaming data such as video and audio to client devices. Some embodiments relate to improved systems and methods to insert ads into video streams including Hypertext Transfer (or Transport) Protocol ("HTTP") based live video streams.

BACKGROUND

An increasing number of live and recorded video and audio programs are being delivered to users via the Internet. Thanks to advances in bandwidth availability, media compression and computing power, more and more users enjoy programs delivered to their mobile and other computing devices. Rather than downloading entire programs for viewing, it is becoming increasingly common to "stream" programs to users by transmitting video or audio data to user devices in a steady, continuous stream. A number of streaming protocols are commonly used, including HTTP Live Streaming promoted by Apple®, Smooth Streaming promoted by Microsoft®, and MPEG-DASH. These streaming protocols define how, for example, a data stream including video, audio, and possibly other ancillary data (e.g. cue points, time code, and closed captioning) is to be packaged or segmented for distribution to client devices.

Many providers of such video streams wish to insert ads or other information into the video streams. For example, one approach to inserting advertisements (or other information, such as scoreboards or other information associated with a program) is to synchronize the advertisements or other information with the video stream at a centralized location such as a studio, and then distribute the same stream to all viewers as a composite stream. In this approach, all viewers receive the same content at the same time. In such approaches, some dynamic advertisements may be inserted depending on viewer attributes, day parting rules, or other conditions, but the dynamic advertisement content is inserted at a known place in the media stream for all viewers. Such approaches do not allow for different viewers to view or interact with the content on different schedules. For example, a viewer is unable to pause or use a digital video recorder ("DVR") style of playback of the stream.

One improvement to such approaches is to provide dynamic ad insertion into live video streams as described in U.S. Patent Application Publication No. 2011/0246661 (hereinafter, the "'661 publication", which is under common ownership or control of the assignee of the present invention). In the '661 publication, ads are dynamically inserted into an HTTP-based live stream using pre-created segments using discontinuity markers. That is, in the '661 publication, discontinuity markers (such as those supported by the HTTP Live Streaming promoted by Apple®) are used to create convenient boundaries at the break points between program and commercial content.

It would be desirable to provide improved methods and systems for personalizing live stream delivery to users in a manner which allows the insertion of an ad (or other content) at any point in an HTTP live streaming segment and which supports live or DVR streams.

BRIEF DESCRIPTION OF THE DRAWINGS

FIGS. 12-13 are illustrations of the operation of instructions pursuant to some embodiments.

DETAILED DESCRIPTION

Figure 1:
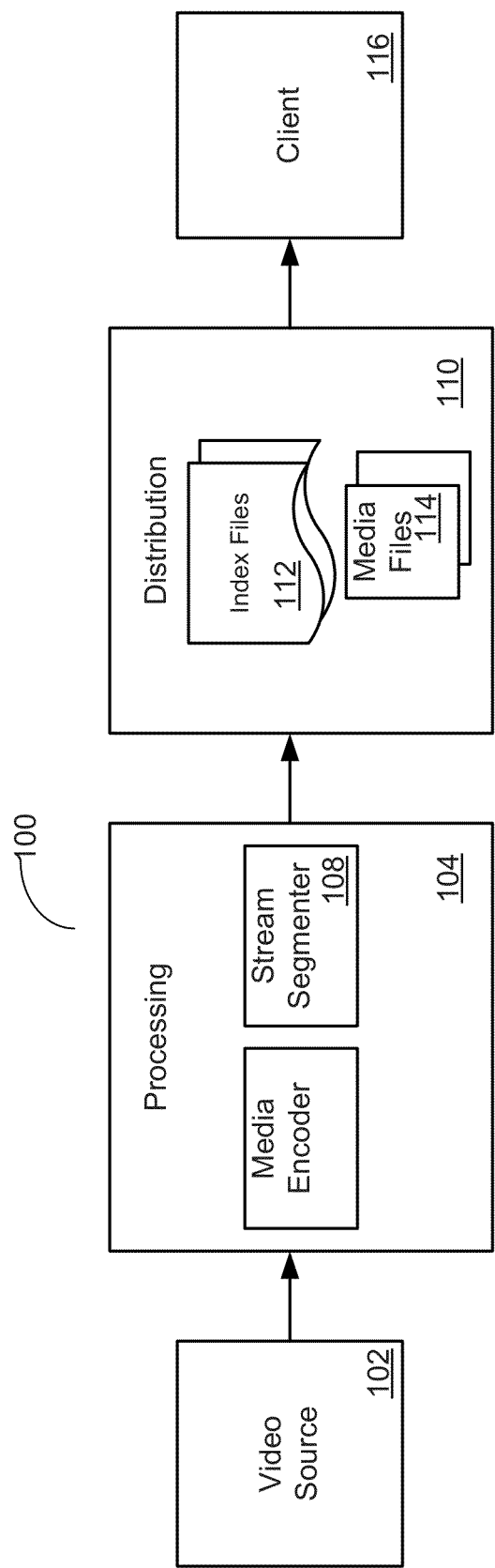
FIG. 1 is an illustration of a video streaming system pursuant to some embodiments.

There is a need for methods, systems, apparatus, means and computer program products to provide improved techniques for inserting content (such as advertisements or the like) into video streams in HTTP live streaming environments. In some embodiments, methods, systems, apparatus and computer program code are provided to clip or modify segments of video streams during play. In some embodiments, an original content stream generated from an input video source is received, the original content stream having a plurality of segments each having a number of frames. An advertisement is identified for insertion into the original content stream at a predetermined point in time and having a predetermined length, the advertisement having a plurality of segments each having a number of frames. The system identifies the starting point in time, along with the plurality of segments associated with that predetermined point in time and removes any frames of the starting segment after that predetermined point in time. An ending point in time is calculated based on the predetermined time and the predetermined length, and an ending of one of the plurality of segments associated with the ending point in time is identified and any frames of the ending one of the segments before the ending point in time are removed. The advertisement is then inserted into the original content stream at the predetermined point in time to produce an updated content stream for delivery to a client device. Pursuant to some embodiments, the predetermined point in time may be an absolute time (e.g., such as a predetermined time slot when an advertisement should air, such as "4:34 PM Eastern Standard Time") or a relative time (e.g., "20 minutes, 30 seconds after the broadcast starts").

The updated content stream may be delivered to clients for viewing by updating or generating an index file identifying the sequence and location of the original, modified, and additional segments in the content stream, including the advertisement.

According to some embodiments, systems, methods, apparatus, and computer program code are provided to process video source data to insert an advertisement include the generation of multiple copies of a stream. In some embodiments, an original content stream is received from an input video source. The original content stream has a plurality of segments each having a number of frames. At least a first copy of the original content stream is generated, the at least first copy of the original content stream having a starting point delayed a first amount from a starting point of the original content stream. An advertisement for insertion at a predetermined point in time is identified which has a predetermined length and a plurality of segments, each having a number of frames. One of the original content stream or the at least first copy of the original content stream are selected as the active content stream, and the advertisement is inserted into the active content stream to produce an updated content stream for provision to a client device. In some embodiments, the active stream is selected based on the predetermined insertion point of time and a starting point of the original content stream.

As used herein, the phrases "video feed" or "video stream" may refer to any signal conveying information about a moving or still image, including audio and ancillary signals and including a High Definition-Serial Data Interface ("HD-SDI") signal transmitted in accordance with the Society of Motion Picture and Television Engineers 292M standard. A "video feed" or "video stream" may also be or include data carrying an MPEG transport stream including compressed data via Asynchronous Serial Interface ("ASI") or the like. Although HD signals may be described in some examples presented herein, note that embodiments may be associated with any other type of video feed, including a standard broadcast feed or a three-dimensional image feed. Moreover, video feeds or received images might comprise, for example, an HD-SDI signal exchanged through a fiber cable or a satellite transmission.

Those skilled in the art, upon reading the following disclosure, will appreciate that features of the present invention may be used with similar desirable results for audio data streams or any time dependent type of data as well.

For simplicity, the live streams described herein will be generally described in the context of the HTTP Live Streaming promoted by Apple® as described in the IETF draft titled "IETF Internet Draft draft-pantos-http-live-streaming '"HTTP Live Streaming'" and available at http://tools.ietf.org/html/draft-pantos-http-live-streaming-10 (the contents of which are incorporated herein by reference in their entirety for all purposes). Those skilled in the art, upon reading this disclosure, will appreciate the features of the present invention may be used with similarly desirable results in other live streaming approaches as well.

Features of some embodiments will now be described by reference to FIG. 1, which is a block diagram of a system 100 for delivering video streams to one or more client devices 108. As shown, the system 100 includes a video source 102, which provides source video data for distribution to one or more client devices 116 pursuant to the present invention. Although a single video source 102 is shown, in many implementations, a plurality of different video sources 102 may be used in conjunction with the present invention. The video sources 102 may include, for example, one or more cameras, production or master control rooms, playback servers, and video routers. Further, video sources 102 may include advertisements and other content associated with a program or broadcast event, such as scores, event information, or the like. As used herein, video sources, which include content or broadcast information (such as a television show, recorded content programming, or the like) will be generally referred to as "video content", while video sources, which include advertising, or other data (such as scores, event information, or the like) will generally be referred to as "ad content". Both video content and ad content source data will be referred to generally as "video data", although those skilled in the art will appreciate that such data also includes audio and other data. A content stream (which may be an HTTP live stream, or a previously-encoded stream of content) prior to application of the processing and embodiments described herein may be referred to herein as an "original content stream" and the resulting updated content stream (after ad content has been inserted) may be referred to herein as the "updated content stream".

The video data produced by such video sources 102 is processed using one or more processing devices 104 which are configured to operate pursuant to the present invention. Pursuant to some embodiments, one or more processing devices 104 are provided which include one or more media encoders 106 and one or more stream segmenters 108. The media encoders 106 may be any encoders allowing the data from the video sources 102 to be encoded into a desired media file format. For example, in some embodiments, the encoders 106 are selected to encode the source data from video sources 102 into MPEG-2 or MPEG-4 media files with H.264 and AAC encoding. In some embodiments, where live streams are desired, the source data is encoded as MPEG-2 transport streams carrying H.264 video, AAC audio, or MP3 audio.

To allow adaptive streaming, source video data must be processed into a segmented format, allowing the switching of bitrates mid-stream during playback, and allowing a desired sequence of segments to be played (as defined in one or more specially formatted index files 112 made available to a client device 116). The video source data from 102 is encoded and provided to one or more stream segmenters 108 to create a plurality of content segments (as well as ad segments) as described further herein. The stream segmenters 108 may be or include, for example, the Apple Media Stream Segmenter or the Apple Media File Segmenters or segmenters configured to perform similar processing. In some embodiments, one or more of the segmenters 108 may be configured to encode multiple content and ad segments in several different bitrate profiles to allow adaptive streaming. For example, segmenter 108 may generate four different encodes of content segments and ad segments, with each encode processed using a different bitrate profile. For example, average bitrate profiles of 440, 640, 1140 and 1340 kbps may be utilized to provide a wide range of video qualities suitable for diverse network conditions. As will be described further herein, in some embodiments, multiple segmenters may be provided to achieve different desirable results.

Once the source video data has been processed into a segmented format, one or more index files 112 are published to one or more Web servers (shown as distribution system 110). The segmented source video data (shown as media files 114) is stored on one or more Web servers (such as a content delivery network or the like) for delivery to one or more client devices 116 over an HTTP connection. The playlists or index files 112 may, for example, utilize the Extended M3U8 playlist format defined by Apple. Further, if multiple bitrate encodes of the source video data have been provided, the index files 112 may instead comprise a master playlist referencing nested playlists of content encoded at different bitrates.

For example, the distribution system 110 may include one or more standard web servers for delivering data streams and other files to the client devices 116. The distribution system 110 may be or include a content delivery network, an edge network, or the like. As will be described further below, the distribution system 110 delivers a series of media files (114) and index files (112) to the client devices 116 over HTTP connections. The client devices 116 may be any of a number of computing devices capable of receiving and displaying media information distributed by the distribution system 110 over the HTTP connections. For example, client devices 116 may include personal computers, handheld devices (such as mobile phones, iPads® or other tablet computers) Internet-connected televisions, or the like. Each of the client devices 116 operates client software (such as a Web Browser) to access and obtain data provided by the distribution system 110 (such as, for example, index files 112 or stream manifest files based on a URL identifying a desired stream of media). The client devices 116 use information in the index files to identify the location of a series of media files 114 in a stream and downloads each media file 114 (or "chunk") in sequence. Once the client device 116 has obtained a sufficient amount of downloaded data, the client device 116 presents or displays the sequence of media files to a user of the client device 116. As the client device 116 fetches the sequence of media files, it periodically checks the index file 112 or stream manifest to obtain the correct sequence of files.

As will be described further herein, embodiments of the present invention utilize a variety of different controls of the stream segmenters 108 to generate different chunks or segments (media files 114) and updates to the index files 112 to allow dynamic and accurate insertion of ad content into HTTP-based live video streams. The controls of the segmenters 108 and index files 112 may be performed using software or components associated with the processing device 104 or one or more devices associated or in communication with the processing device 104.

Applicants have provided several different embodiments, which allow the improved insertion of ad content into video streams. In a first embodiment, which will be described in conjunction with FIGS. 2-4, systems and methods are provided to allow a segment to be subclipped or modified to allow precise ad content insertion into a video stream, even where the ad content is to be inserted in the middle of a segment. The processing of FIGS. 2-4 may be implemented, for example, under control of computer program code provided to interact with one or more stream segmenters 108 in the processing device 104.

Figure 2:
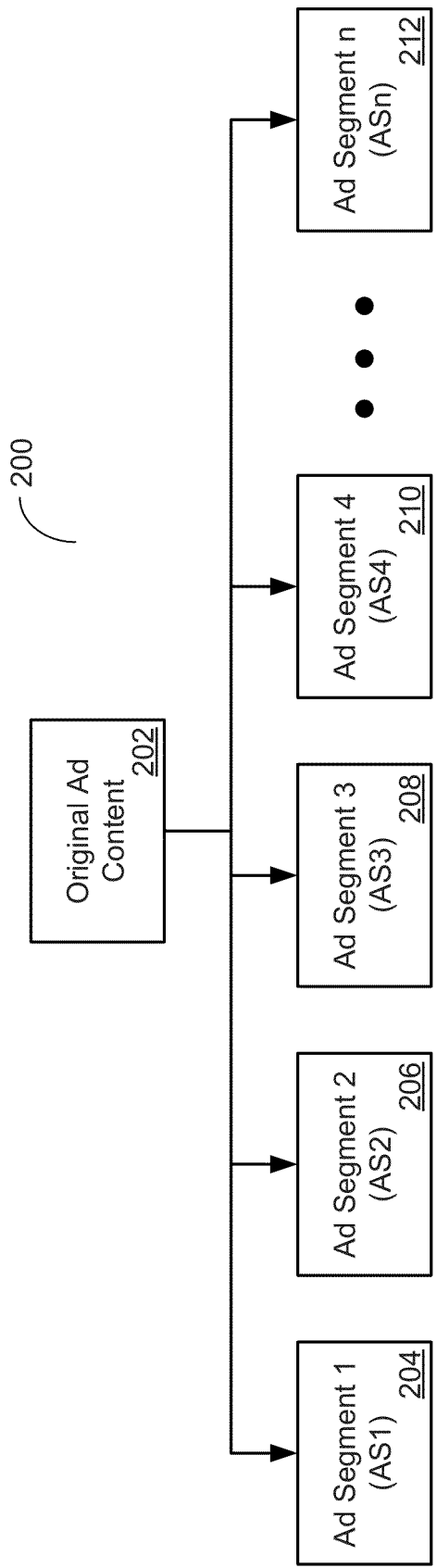
FIG. 2 is an illustration of an item of ad content for processing by systems pursuant to some embodiments.
Figure 3:
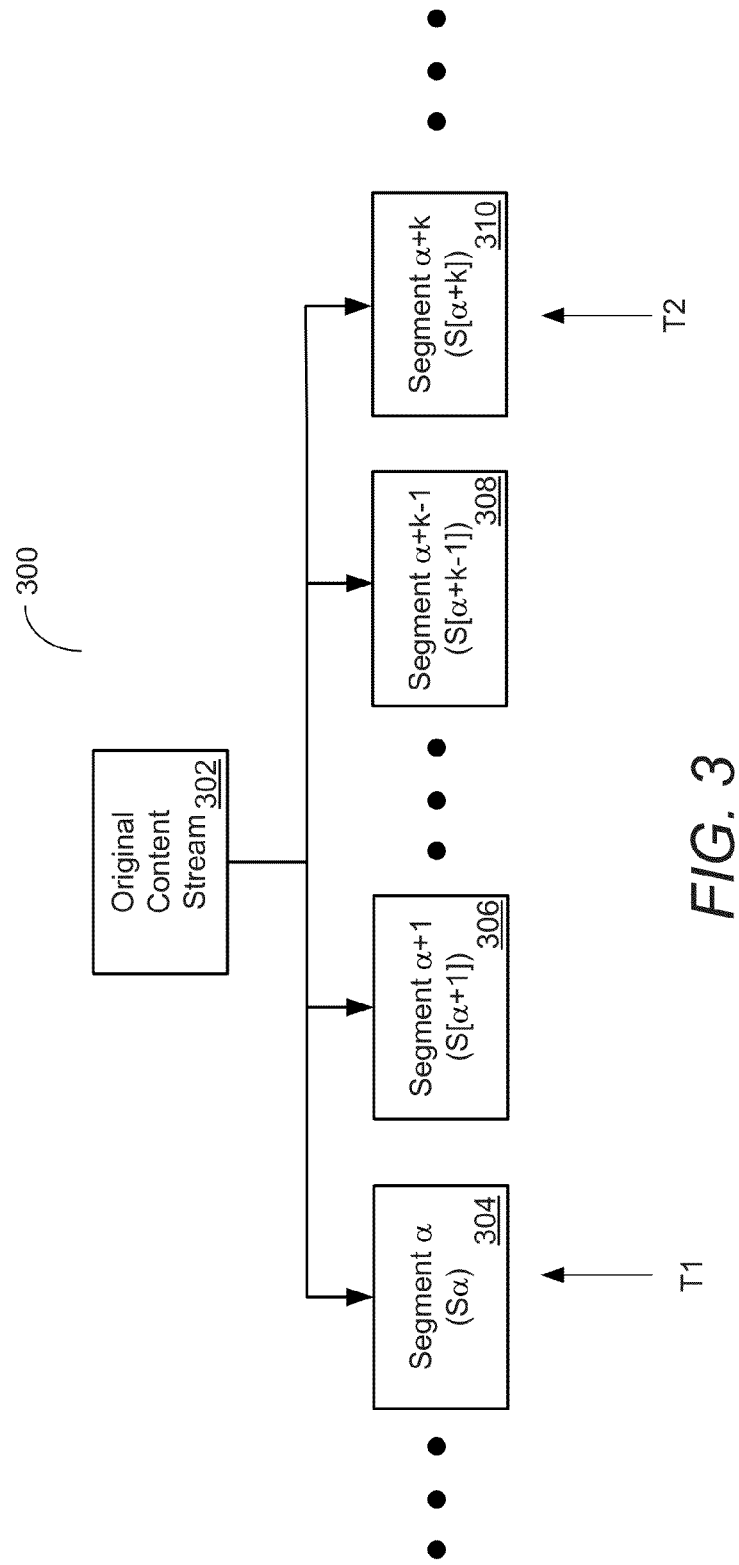
FIG. 3 is an illustration of an original content stream for processing by systems pursuant to some embodiments.

Reference is first made to FIGS. 2 and 3, which show block diagrams representing an item of ad content (FIG. 2) and an original content stream (FIG. 3). A determination has been made that the item of ad content is to be inserted into the content stream of FIG. 3. Reference to specific aspects of FIGS. 2 and 3 will now be provided as context to the introduction of a first embodiment of the present invention. FIG. 2 is a block diagram 200 that represents an item of ad content 202, which has been processed by a segmenter (such as the stream segmenter 108 of FIG. 1) to create a series of n segments 204-212 (segments AS1-ASn). In some embodiments, each segment 204-212 has a length imposed by the segmenter 108. In some embodiments, the length of each segment may be between 4-10 seconds (although in example embodiments described herein, a segment length of 6 seconds will be used as an illustrative example). The length of the ad content 202 will be referred to herein as a length of time "M" (where M is equal to the sum of the lengths of all of the segments 204-212). An ad serving or other engine has determined that the ad content 202 is to be inserted into a stream of content (the functioning of the ad serving or other engine will not be described herein, as the functioning of an ad server is outside the scope of the present invention and a number of existing ad serving approaches may be used with the present invention).

Referring now to FIG. 3, a block diagram 300 is provided that represents an original content stream 302. The content stream 302 is a media stream that is available to users operating client devices to view (e.g., the stream includes a number of segments that have been processed by a segmenter such as the stream segmenter 108 of FIG. 1 and for which one or more index files 112 and media files 114 have been created). The original content stream 302 is composed of a sequence of media segments, beginning with Segment 1 (not shown in FIG. 3), and including segment S[α] (item 304) through segment S[α+k] (item 310), and may include a number of segments beyond segment S[α+k] (not shown in FIG. 3). A decision has been made (e.g., by an ad server or other system in communication with the processing device 104 or distribution device 110) to insert an advertisement (with the original ad content 202 of FIG. 2) at a particular point in time in the original content stream 302 shown as time "T1". Because the length of the original ad content 202 is known to be equal to "M", the inserted advertisement will end at a point in time "T2" where T2=T1+M.

Prior ad insertion approaches were unable to make such an insertion, as points T1 and T2 occur in the middle of a segment (point T1 occurs in the middle of segment 304, and point T2 occurs in the middle of segment 310). Embodiments of the present invention allow the insertion of an ad or other content a point in the middle of an HTTP-based live stream segment.

Figure 4:
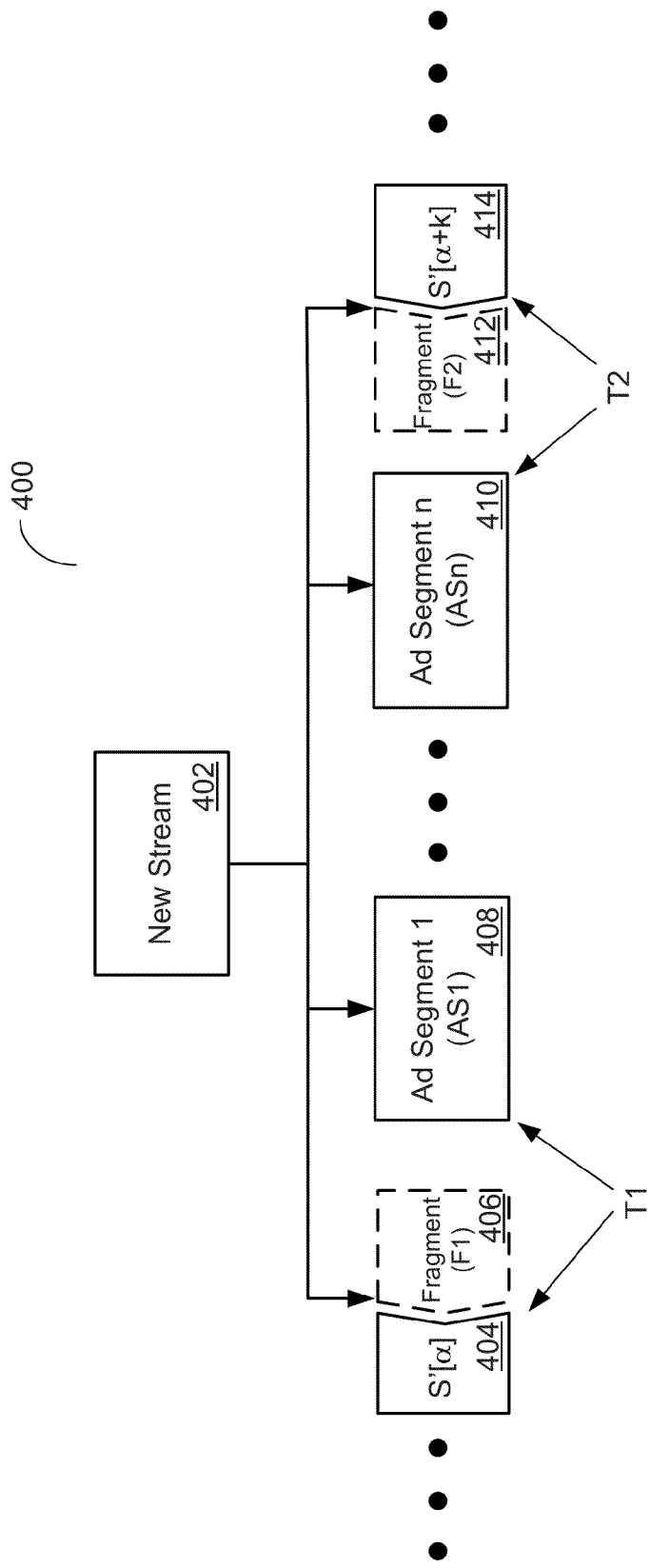
FIG. 4 is an illustration of a combined stream processed pursuant to some embodiments.

One embodiment will now be shown and described by reference to FIG. 4, where a block diagram 400 illustrating a new stream 402 which results from insertion of the original ad content 202 (of FIG. 2) into the original content stream 302 (of FIG. 3). The resulting new stream 402 includes two segments, which are clipped or modified to reduce the size of the original segment. In particular, as shown, segment S'[α] (item 404) has been clipped to remove a fragment (F1, item 406) so that ad segment 1 (AS1, item 408) begins at the desired starting time (T1). The fragment F1 (item 406) is discarded from the new stream 402. The segment 404 may be clipped by removing one or more frames from the segment such that the total number of frames removed allows the first ad segment (AS1, item 408) to begin at the desired starting time (T1).

A similar clipping is shown as occurring in segment 414 (segment S'[α+k]). In particular, a fragment (F2, item 412) is created by removing one or more frames from segment 414 to ensure that segment 414 starts at time (T2)—the end of the inserted ad content 202. Again, the fragment 412 is discarded from the stream. In this manner, embodiments provide a mechanism to subclip a segment on the fly for precise ad insertion (even where the ad is to be inserted at the middle of a segment). Pursuant to some embodiments, the insertion of such ads may be performed substantially in real time as content is delivered to a client (such as client 116 of FIG. 1) by updating one or more index files 112 in a distribution system 110. In some embodiments, the new stream 402 (FIG. 4) is substantially the same length as the original content stream 302 (FIG. 3); that is, the insertion of ad content does not extend the length of the new content stream. Pursuant to some embodiments, the result is a content stream that is delivered to a client device as a continuous stream, substantially without any discontinuities or breaks between the content and the inserted content. In general, as used herein, the term "substantially without any discontinuities or breaks" refers to a stream that is delivered to a client without any perceptible breaks or pauses between the content and the inserted content (such as an advertisement).

Features of further embodiments of the present invention will now be described in which a mechanism is provided to control the size of segments when performing such clipping operations. In some embodiments, the size of segments is controlled by caching more redundant streams. In some embodiments, the size of segments is controlled by resegmenting a larger set of video on the fly, for the purpose of higher-quality stream buffering and playback. Such embodiments will now be described by reference to FIGS. 5-9.

Figure 5:
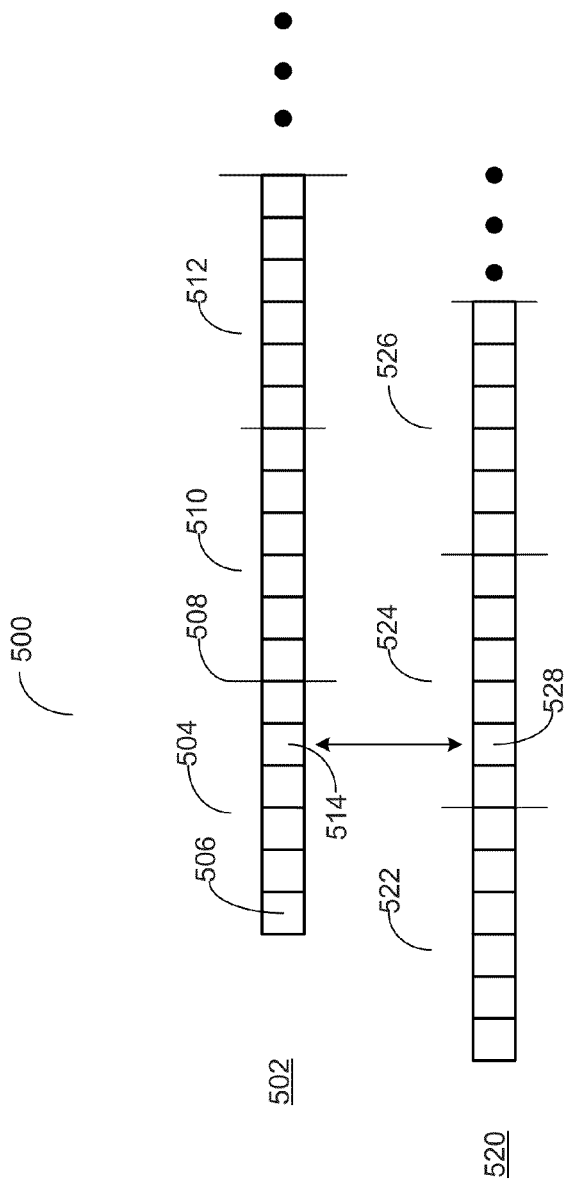
FIGS. 5 and 6 are illustrations of streams processed pursuant to some embodiments.

In certain HTTP live streaming environments (such as those promoted by Apple, Inc., for example) clipping a segment inappropriately may lead to errors at the client device. For example, if a segment is clipped such that it is too small (e.g., it only has one or two frames, or if the clipped segment does not have an I-frame), play of the segment can cause problems with the client device's buffering strategy. In some embodiments, to reduce such problems, multiple copies of a stream are maintained with overlapping segments to ensure that any subclip can be created with a desired initial segment size. Referring now to FIG. 5, an embodiment that generates two copies of a stream is shown which ensures that any subclip can be created with an initial segment size at least half the size of the original segment.

FIG. 5 shows a block diagram 500 including two copies of a stream. The streams are segmented using one or more stream segmenters (such as stream segmenter 108 of FIG. 1) that are controlled to generate the streams with different timing strategies (some of which will be discussed further below). In particular, two copies of a stream are shown, a first copy 520 and a second copy 502. Each of the streams 520, 502 is depicted as having a series of frames (such as frame 506 of stream 502). For illustrative purposes, each of the streams 520, 502 are shown as having 6 frames per segment. For example, three segments (504, 510 and 512) of the second copy 502 of the stream are shown, with each segment 504, 510, 512 having a boundary (such as 508, the boundary between the end of segment 504 and the beginning of segment 510)—these boundaries are shown for clarity and ease of illustration.

Pursuant to some embodiments, to avoid clipping a stream (as described above in conjunction with FIG. 4) in a way that creates a segment that is too small to be properly processed by a client device, two copies of a stream are created (as shown in FIG. 5). By using two copies of a stream, an ad insertion algorithm can be used to decide which of the two stream copies are to be used to clip and insert an ad, based on the effect the clipping would have on a client's processing of the stream. For example, assume that an ad insertion is to occur at a frame designed as 514 (of stream copy two 502), 528 (of stream copy one 520). If stream copy two 502 were to be used, a segment 504 having only a single frame would result. Using such a small segment 504 may cause buffering and playback issues with a client device and would be undesirable. Instead, stream copy one 520 should be used, resulting in a segment 524 being clipped and leaving five frames in the segment. In some embodiments, multiple stream copies are used to allow the selection of a most appropriate stream copy to use in a clipping operation as described above in conjunction with FIG. 4.

Figure 6:
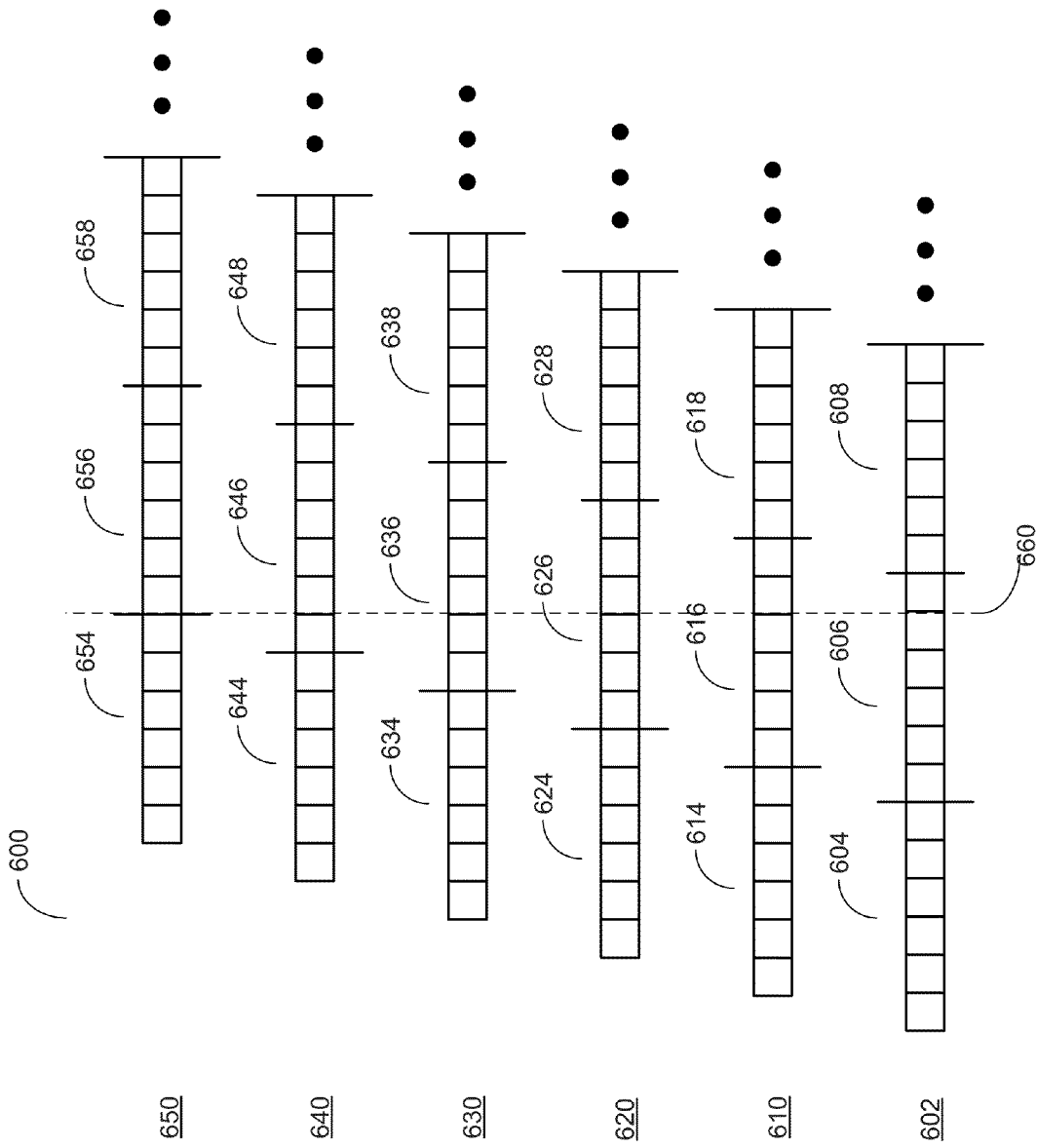

In some embodiments, the clipping operations may include further parameters to ensure that certain segments of a stream not be clipped so as to improve client performance. For example, in some embodiments, it may be desirable to not clip a first segment of a stream. Reference is now made to FIG. 6 where an embodiment that utilizes multiple copies of a stream is shown. In particular, in the embodiment illustrated in FIG. 6, six copies of a stream are created (identified as streams 602, 610, 620, 630, 640, and 650). Each of the stream copies is offset by one second. That is, the start point of stream copy two (610) is one second after the start point of stream copy one (602). This results in a set of stream copies where any segment is available that has a start that is no earlier than $\frac{1}{6}^{th}$ of the segment length (here, the segment lengths are 6 seconds). That is, it is guaranteed that a segment exists that starts no more than 1 second prior to the requested start point. This allows a stream to be provided quickly, with a large start segment such that there is no transcoding required until the last segment is needed. For example, if an advertisement is to be inserted at point 660, a stream copy (602, 610, 620, 630, 640, or 650) can be selected which has the most appropriate point at which the advertisement can be inserted.

In the illustrated streams, with an ad insertion point at 660, the most appropriate stream copy to be selected for use is stream copy 650, as stream copy 650 has a segment 656 starting at point 660. Stream copy 602 would not be the most desirable stream copy to be used, as clipping at point 660 would result in a single frame segment being created (from segment 606). The result is an ability to dynamically insert ad content at appropriate points in a stream, improving playback and an improved viewing experience by a wide variety of client devices.

Pursuant to some embodiments, the generation and selection of segments may be performed using computer program code. For example, for video sources 102 which may involve some dynamic ad or other content insertion, a predetermined number of stream copies may be generated by a stream segmenter 108 (which may include multiple segmenters as will be described further herein). The stream segmenter 108 may be controlled to make stream copies using a formula such as $S=(M/(M-K))$, where "S" is the number of stream copies to be made, "M" is the length of each segment (e.g., in the examples provided herein, segment lengths of six seconds are described), and "K" is the target minimum segment size required after clipping the start of a segment. In some embodiments, "K" is at least equal to one frame (or, as described in the examples herein, at least one second). In some embodiments, if it is desired to eliminate initial clipping of a segment (as described above in conjunction with FIG. 6), the value of "M−K" should be set to equal the maximum allowable distance between the required in point and the actual segment start point. Pursuant to some embodiments, the settings of the stream segmenter 108 may be set on a per-program or per-video source basis.

Figure 7:
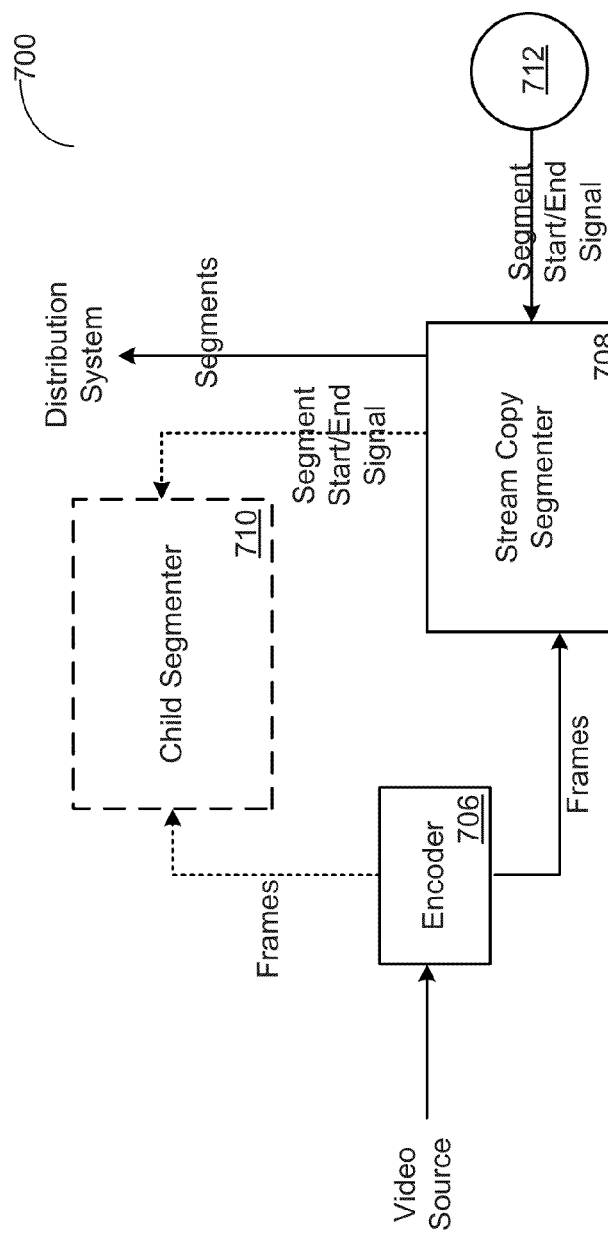
FIG. 7 is an illustration of a block diagram of a portion of a processing device pursuant to some embodiments.

As described above, a number of stream segmenters 108 may be used to generate the multiple stream copies described herein. Features of a process for generating the stream copies will now be described by reference to FIG. 7. More particularly, FIG. 7 depicts portions of a processing device (such as the device 104 of FIG. 1) that may be used to generate multiple index and media files for distribution by a distribution device 110. As shown in FIG. 7, a processing device includes a media encoder 706 (such as the encoder 106 of FIG. 1) that encodes video source data (including content and advertisements) into a plurality of frames. The frames are passed to one or more stream copy segmenters 708 for generating segments (including index files and media files) for distribution by a distribution system (such as the distribution system 110 of FIG. 1).

As shown in FIG. 7, the segmenters 708 include a timing input received from a clock 712 which provides a segment start/end signal to control the segmenter 708. Pursuant to some embodiments, multiple stream copies may be generated by providing a collection of segmenters 708 that are responsible for the segmentation of a particular segment copy (such as the multiple copies shown in FIG. 6 or elsewhere herein). Pursuant to some embodiments, each segmenter 708 may control a second segmenter (shown in FIG. 7 as a child segmenter 710). Pursuant to some embodiments, the child segmenter 710 operated in conjunction with the stream copy segmenter 708 and the clock 712 to synchronize the stream copies. For example, in the embodiment shown in FIG. 7, the stream copy segmenter 708 accepts frames in real time from the encoder 706. The stream copy segmenter 708 places the received frames in a "current segment". When certain kinds of frames are received from encoder 706, the stream copy segmenter 708 may stop adding frames to the current segment, and instead send that segment to a distribution system (or other destination). The stream copy segmenter 708 may then begin a new "current segment" which initially contains no frames.

At approximately regular intervals, the clock 712 (which may be a clock or some other parent control that controls timing operations) sends a segment start/end signal to the stream copy segmenter 708. Upon receipt of this signal, the stream copy segmenter 708 sets a flag, and the first I-frame that is received from the encoder 706 is used as the boundary between the current segment and the next "current segment". As shown in FIG. 7, an optional child segmenter 710 may also be provided (e.g., a child segmenter 710 may be provided to generate stream copies such as shown in FIGS. 5 and 6). If one or more child segmenter(s) 710 are used, the stream copy segmenter 708 sends a segment start/end signal to the child segmenter(s) 710 to control the timing of generation of the stream copies by the child segmenter(s) 710. In this manner, a set of segmenters may be chained in such a way that each segmenter produces a particular copy of the stream, with segment start points timed at a specific interval.

The operation of multiple stream copy segmenters to generate multiple stream copies pursuant to some embodiments will now be described by reference to FIG. 8, where a portion of a processing system (such as the system 104 of FIG. 1 is shown). In particular, to illustrate certain embodiments, a system 800 is shown which is configured to perform segmentation in an environment where the number of stream copies to be made is equal to three. That is, the formula is used to determine the number of stream copies ("S") to be made, where S=(M/(M−K)), where "M" is the length of each segment, and "K" is the target minimum segment size required after clipping the start of a segment. In the illustrative embodiment in FIG. 8, each segment is 5 frames long, and M=5, and the minimum segment size after clipping ("K") is 3. Therefore, S=(5/(5−3)) or S=2.5 (which is rounded up to 3, yielding a need for three segments). As a result, three stream copy segmenters are provided (items 808, 809, and 810). In the embodiment depicted, two of the segmenters (809, 810) are configured as child segmenters and receive timing information from the main stream copy segmenter 808. In other embodiments, each segmenter 808, 809, 810 may receive the timing information from the same source (clock 812) and the child segmenters 809, 810 may apply an offset to the clock signal.

In the embodiment depicted, the clock 812 sends a start/end signal to segmenter 808 every 5 seconds (as the segment length "M" in this embodiment is equal to 5 seconds). Segmenter 808 sends a start/end signal to segmenter 809 (M−K=2 seconds) 2 seconds after the beginning of segmenter 808's current segment. Segmenter 809 sends a start/end signal to segmenter 812 2 seconds after the start of segmenter 808's current segment. Each segmenter 808, 809, 810 receives frames from encoder 806. When an I-frame is received (from encoder 806) at any of the segmenters 808, 809, 810, then each segmenter will end its current segment if that segmenter 808, 809, 810 has received a start/end signal. Further, once a segment has ended and a new segment begun, any start/end signals received by a segmenter 808, 809, 810 is ignored and a new start/end signal must be received by that segmenter to trigger the transition to a new segment. In this manner, any number of segment copies may be generated and synchronized such that a store of available segments and copies are generated which may be selected and used for clipping as described herein.

Figure 8:
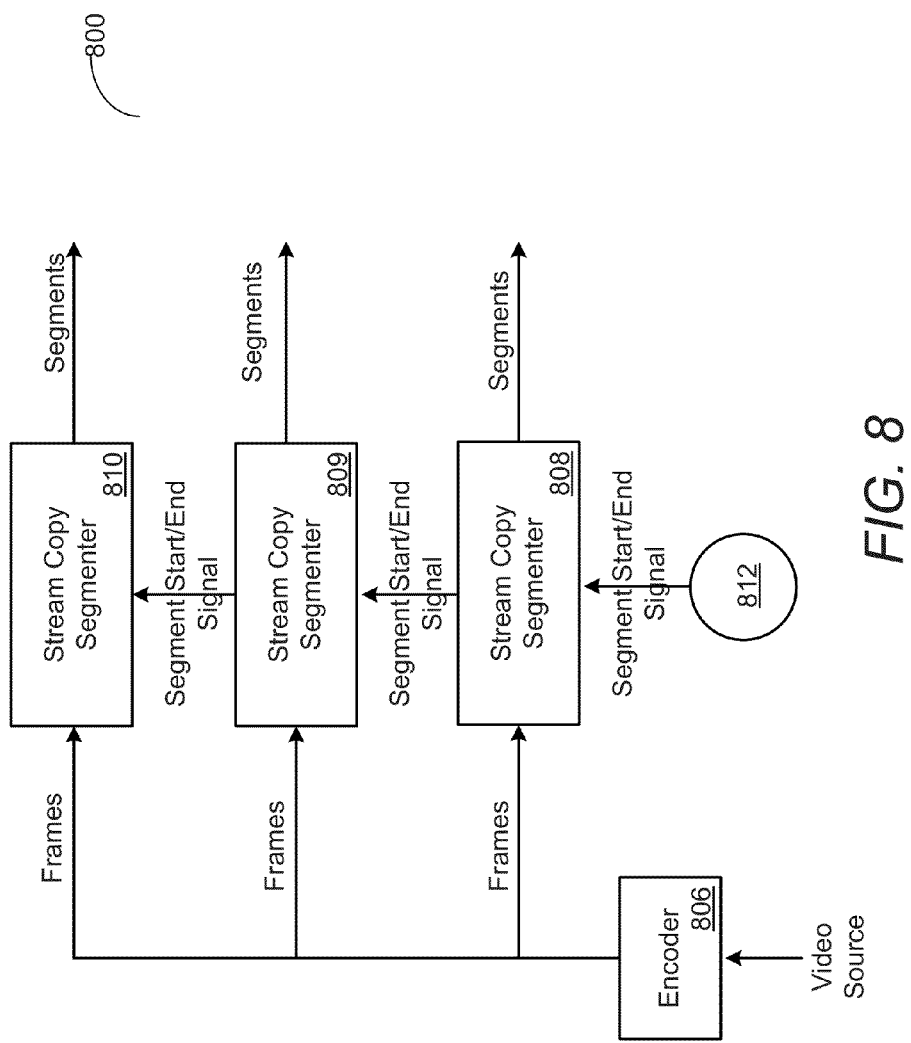
FIG. 8 is a further illustration of a block diagram of a portion of a processing device pursuant to some embodiments.
Figure 9:
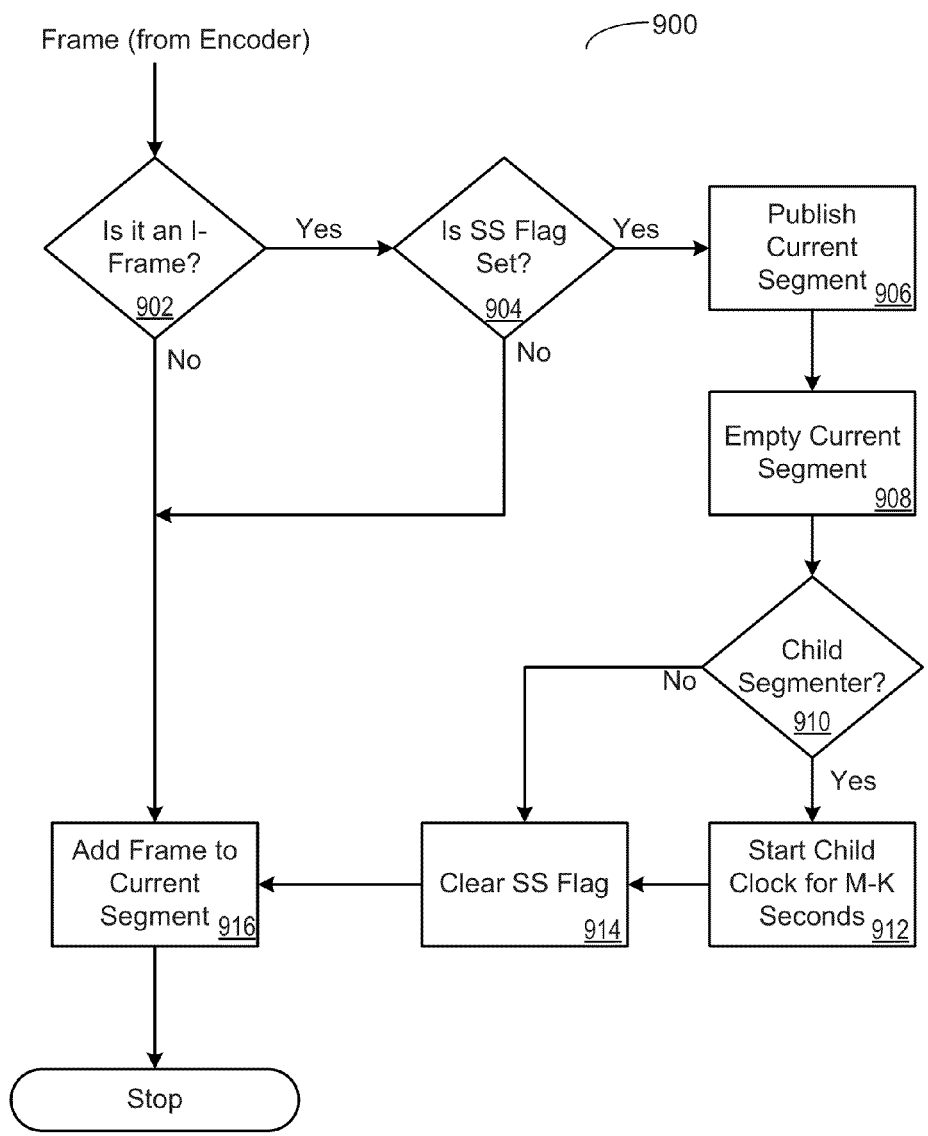
FIG. 9 is a flow diagram depicting a process for operating a processing device pursuant to some embodiments.

Reference is now made to FIG. 9, where a flow diagram 900 is shown which illustrates a process used by a segmenter (such as segmenter 108 of FIG. 1, segmenter 708 of FIG. 7, or any the segmenters of FIG. 8). The process 900 may be implemented as computer program code in conjunction with each segmenter as described herein to control the generation of segments that are optimized for use in situations where an ad or other content may be inserted into a video stream (e.g., such as described above in conjunction with FIG. 4). The process 900 may be performed for each frame received from an encoder (such as the encoder 106 of FIG. 1). First, a determination is made at 902 whether the frame received is an I-frame. In certain HTTP live streaming environments (such as those promoted by Apple, for example), an I-frame (or Intra frame) is an encoded video frame whose encoding does not depend on any other frame. If the received frame is not an I-frame, processing continues at 916 where the received frame is added to the current segment being processed by the segmenter.

If processing at 902 indicates that the received frame is an I-frame, processing continues at 904 where a further determination is made whether a segment start ("SS") flag has been set for the segmenter (which indicates whether the parent of this segmenter, whether it be the master clock or another segmenter, has sent the segmenter a segment start/end signal as described in FIG. 7 above). If the SS flag has not been set, processing continues at 916 and the received frame is added to the current frame being processed by the segmenter.

If the SS flag has been set, processing continues at 906 where the segmenter is operated to publish the current segment (e.g., by providing the media files and associated index files to a distribution system such as distribution system 116 of FIG. 1). That is, when the SS flag is set, as soon as an I-frame is received by a segmenter, the segmenter will push the current segment off to its next destination, so that a new empty segment may be created, and place the I-frame in that segment. Processing then continues at 908 where the segmenter is controlled to empty the current segment (e.g., by clearing a buffer or cache). Processing continues at 910 where a determination is made whether a child segmenter is associated with the segmenter (e.g., in situations where the segmenter performing the process 900 is a stream copy segmenter such as segmenter 708 of FIG. 7 with a child segmenter such as item 710 of FIG. 7). If so, processing continues at 912 where the child clock is started for "M−K" seconds (to ensure an appropriate offset is applied to the stream generated by the child segmenter). If there is no child segmenter (or after the child clock is started) processing continues at 914 where the segmenter is operated to clear the segment start ("SS") flag, and then at 916 where the current frame (received at the start of the process 900) is added to the current segment.

Pursuant to some embodiments, a number of clocking approaches may be used to generate the segment start/end signal (as described in FIG. 7). For example, each of the segmenters may be controlled by a central clock, such that each segmenter either applies its own offset. As another example, each of the child segmenters may be controlled by a segment start/end signal received from a parent segmenter (such as shown in block 912). In either event, the individual segmenters are controlled to allow each segment to cooperatively produce segments that are aligned properly and of the correct size (e.g., as described in conjunction with FIGS. 5 and 6 above). The result is a mechanism and processes for controlling the size of segments during subclipping operations (to allow the insertion of ad or other content into a content stream) by resegmenting a larger set of video on the fly, thereby allowing higher-quality stream buffering and playback on client devices.

Embodiments of the present invention also include mechanisms and processes for managing the stream clock for a particular connection, both to allow dynamic ad (or other content) insertion with respect to location and ad length, for more personalized ad insertion, and to allow the stream clock to be used by additional services (e.g., such as for a game clock and game score in situations where the invention is used to provide live streaming of sporting events or the like). Features of such embodiments will now be described by reference to FIGS. 10-17.

Pursuant to some embodiments, systems and methods are provided which provide a solution to the problem of inserting (or delaying or pausing) video content and maintaining synchronization with a second process. Some embodiments use features of encoded video streams (such as MPEG encoding techniques) that employ a stream packet format that includes timing information. For example, MPEG encoded streams may include a program clock reference ("PCR") data element (or field) and an original program clock reference ("OPCR") data element (or field). The PCR data allows a decoder or client to present synchronized content. Embodiments include techniques to update PCR data in a stream to synchronize segments with inserted or other content as will be described herein. The following embodiments will be described by reference to MPEG-4 Transport Streams; however, those skilled in the art, upon reading this disclosure, will appreciate that similar techniques will be used in any stream with appropriate or similar metadata storage.

Figure 10:
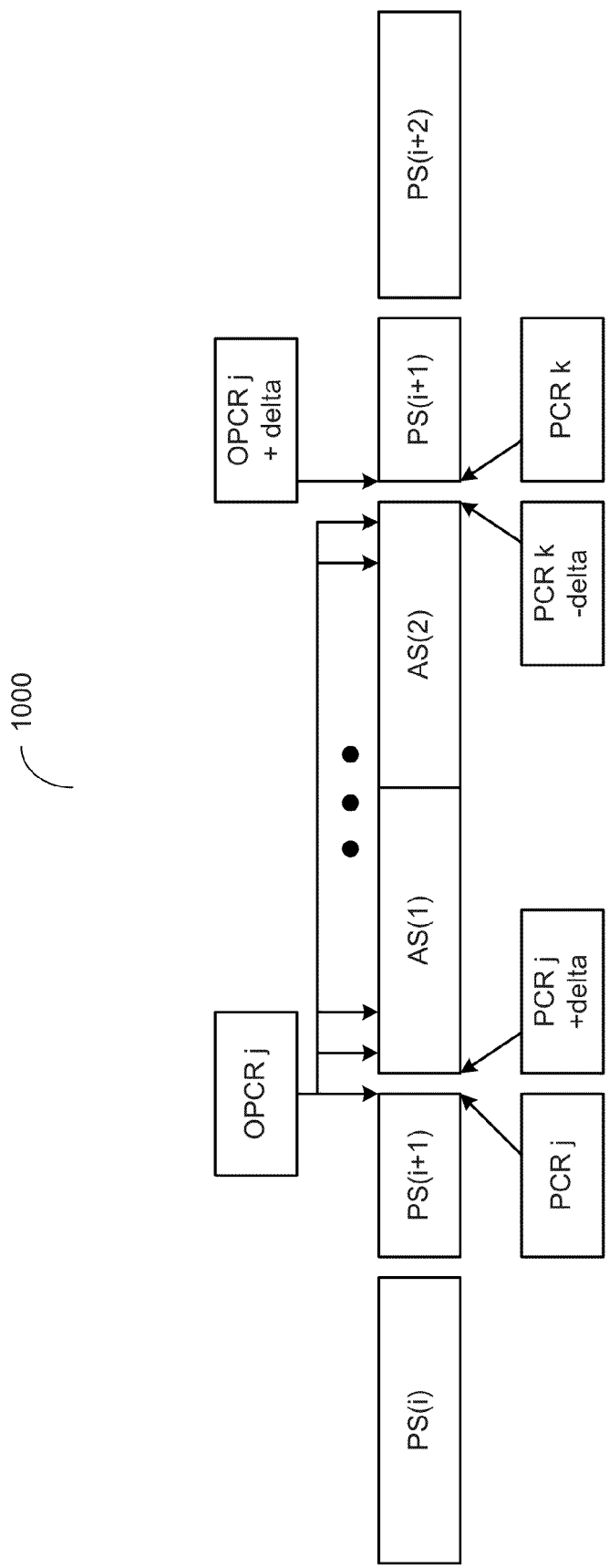
FIGS. 10-11 are illustrations of block diagrams depicting streams processed pursuant to some embodiments.

Reference is now made to FIG. 10, where a block diagram 1000 depicts an original program stream (designated as PS(xx)) with an ad stream (designated as AS(xx)) inserted therein. In particular, the block diagram 1000 depicts a situation where the original program stream was composed of transport segments PS(i), PS(i+1), etc. and in which a ad was inserted at a point in time represented by PCR j. The point in time of the insertion is in the middle of a program segment (PS(i+1)). Pursuant to some embodiments, the segment PS(i+1) is split into two segments and the ad segment is inserted (composed of AS(1) and AS(2)). A discontinuity is created between the first subsegment of PS(i+1) and AS(1) as well as between AS(2) and the second subsegment of PS(i+1). To present a client device (such as the device 116 of FIG. 1) with a continuous stream without the discontinuity, embodiments of the present invention update the PCR data in each segment so that the presentation clock may run normally. However, this prevents the PCR data from being used to synchronize with other processes. As a result, pursuant to some embodiments, at insertion time (point PCR j), the PCR data of each of the following program segments are changed by adding the length of the inserted advertisement. Pursuant to some embodiments, this change to the PCR data for all the following segments is performed by using the OPCR data element in all segments beginning at AS(1) to hold the value of the original program clock (PCR). The control techniques used to update the program clocks will be described further below pursuant to some embodiments.

Figure 11:
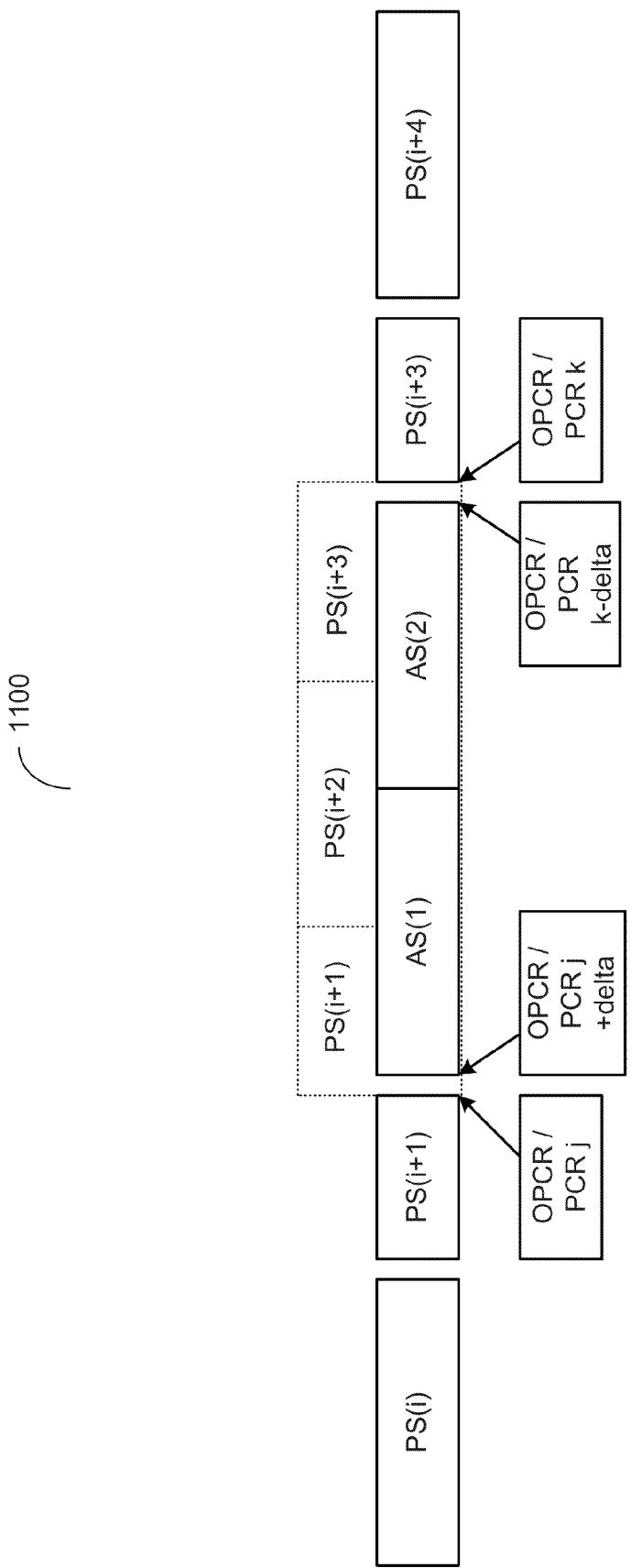

A further embodiment is illustrated in FIG. 11, where a block diagram 1100 depicts an original program stream onto which an advertisement is overlayed. Since the advertisement is overlayed, there is no need to decouple the PCR from the OPCR. Instead, segments PS(i+1) and PS(i+3) are split, and the media overlayed by AS(1) and AS(2) are discarded. The PCR data and the OPCR data in AS(1) and AS(2) are set so they are aligned with the program segments they overlay. The splitting and discarding of portions of segments PS(i+1) and PS(i+3) may be performed using the techniques described above.

Pursuant to some embodiments, a number of instructions are provided that may be executed in a processing device (such as the processing device 104 of FIG. 1) configured pursuant to the present invention. The instructions are provided to transform segments for the use of a particular stream that requires ad insertion or other personalized change (such as the display or presentation of other data such as the score of a sporting event or the like). In some embodiments, a number of instructions are provided, each constructed to cause different timing updates, including instructions to: recompute the PCR, split a segment, marry two segments, shorten a segment, insert a segment, and overlay a segment. Further, a no operation instruction may also be provided. The no operation instruction may be used because otherwise a composition or string of instructions may lead to a net effect of performing no action at all.

Each instruction may include one or more arguments or parameters. For example, an instruction (e.g., a "recompute instruction") may be provided which causes the PCR of any segment to be recomputed. The recompute instruction may include several arguments, including an amount of time to add (or subtract) from the PCR, as well as a starting point and an ending point for the recompute operation.

Pursuant to some embodiments, the concept of applying filters consisting of instructions or sets of instructions to a segment is used. Such filters may be constructed and defined to allow more efficient programming and usage of the instructions presented herein. For example, a filter may be constructed with input parameters that define how the instruction is applied. As an illustrative example, a filter "Recompute PCR" with the parameters 0, 99999999, 500 may be used where the parameter "0" indicates that segments completely contained within the timecodes between 0 and 99999999 are processed to have their PCR recomputed to add 500 to the original timecode. In general, a filter may cause the execution of one or more instructions (or more than one other filters) in a particular order. A sequence of instructions or filters may be algebraically reduced to obtain a smaller set of instructions or filters or a set of equivalent instructions or filters that can be applied more efficiently.

An illustrative example of a set of instructions that can be executed on a video on demand stream or the portion of a live stream that has already been recorded will now be provided by reference to FIGS. 12-13. In particular, FIG. 12 shows a four segment stream of length 40 seconds, and a 30 second ad which is to be inserted into the stream at time 15,000 (15 seconds). FIG. 13 shows each of the instructions that may be applied in sequence along with the output of each instruction (which is the input to the following instruction).

Figure 14:
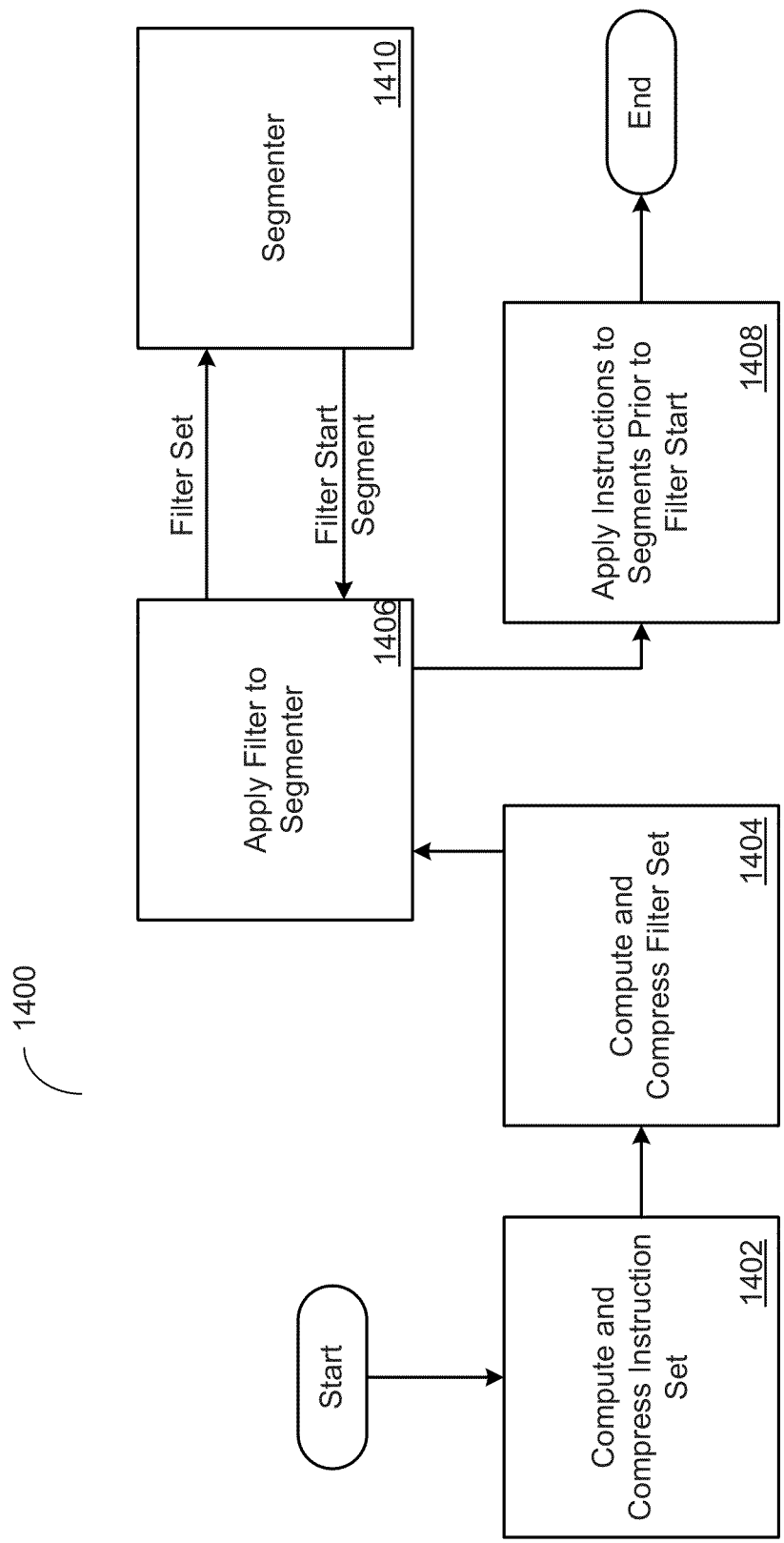
FIG. 14 is a flow diagram depicting a process for operating a processing device pursuant to some embodiments.

Reference is now made to FIG. 14, where a process 1400 is shown which may be used in the case of a live stream or a DVR stream to allow management of the stream clock pursuant to the present invention. More particularly, the process 1400 is used to determine the appropriate composition of a set of instructions associated with a given stream. Processing begins at 1402 where the instruction set is computed (and, in some embodiments, compressed). For example, a set of instructions (such as a set of instructions as shown in FIG. 13) is computed to allow a live stream or DVR stream to be processed pursuant to the present invention (e.g., such as to insert an advertisement or other item of content in the live stream or DVR stream). The calculation of the set of instructions may be performed, for example, as described above in conjunction with FIG. 11 or the like.

Processing continues at 1404 where a filter set is identified (and, in some embodiments, compressed) based on the set of instructions identified at 1402. The filter set may be, for example, one such as described above in conjunction with FIG. 11. Processing continues at 1406 where the filter (which includes the identified instructions) is applied to a stream segmenter 1410. The stream segmenter 1410 returns information identifying the filter start segment (e.g., information identifying which segment of the stream generated by the segmenter is to be the starting segment). Processing then continues at 1408 where the instructions (computed or selected at 1402) are applied to the segments prior to starting the filter. In this way, embodiments allow streams to be processed in live or DVR streaming environments.

Figure 15:
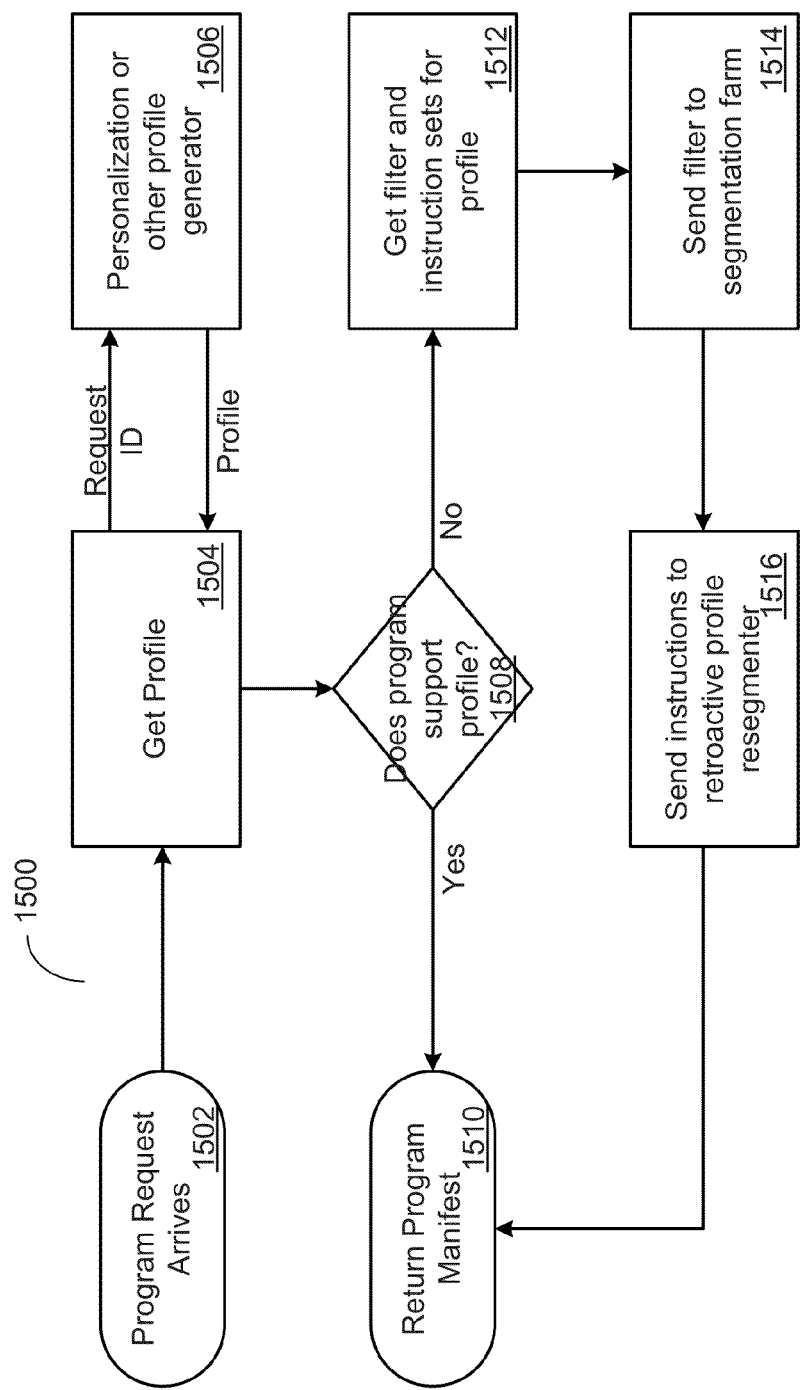
FIG. 15 is a flow diagram depicting a process for operating a processing device to apply a profile pursuant to some embodiments.

Pursuant to some embodiments, profiles may be used which consist of a set of filters or instructions that may be applied to a program (such as a collection of streams). The set of filters may be applied, for example, to prevent corruption during insertion and other processing pursuant to the present invention within a program delivered via HTTP live streaming technologies and manipulated using features of the present invention. Reference is now made to FIG. 15 where a process 1500 for applying a profile to a program is applied. In some embodiments, a profile is applied to a program one time, and process 1500 helps to ensure that the profile is applied only one time during a program. Process 1500 may be performed using a processing device such as the device 104 of FIG. 1, and may begin at 1502 where a program request arrives. The program request may arrive, for example, from a client device 112 in communication with a distribution device 110 (where devices 110, 112 are shown in FIG. 1).

Upon receipt of the program request, processing continues at 1504 where a profile associated with the program request is obtained by presenting a request ID to a personalization or other profile generator at 1506 (which returns a profile associated with the request ID). Processing continues at 1508 where a determination is made whether the program (requested by the client) supports the profile identified at 1506. If so, processing continues at 1510 where the program manifest file is returned to the client device (or to the distribution device as appropriate). If the determination at 1508 is that the program does not support the profile, processing continues at 1512 where the processing device obtains the appropriate filter and instruction sets for the identified profile. The filter and related instruction sets are sent (at 1514) to one or more segmentation devices (such as the array or chain of segmentation device shown in FIG. 8 or 18 or the like, depending on the nature of the segmentation to be performed). In some embodiments, the instructions may be sent to a retroactive resegmenter that may be used to resegment previously encoded content. For example, a retroactive resegmenter may be a set of segmenters that are controlled to operate on existing encoded content (such as previously recorded or stored content as opposed to live streaming content). An example of a system including a retroactive resegmenter will be described further below in conjunction with FIG. 17. Once the segmentation has been performed, the resulting program manifest is generated and transmitted to the distribution device for delivery to the client at 1510. Pursuant to some embodiments, a profile may be applied after a program begins both for robustness and for efficiency. If a particular profile is never needed, then it is simply never used, thereby conserving computational time, bandwidth and storage.

Figure 16:
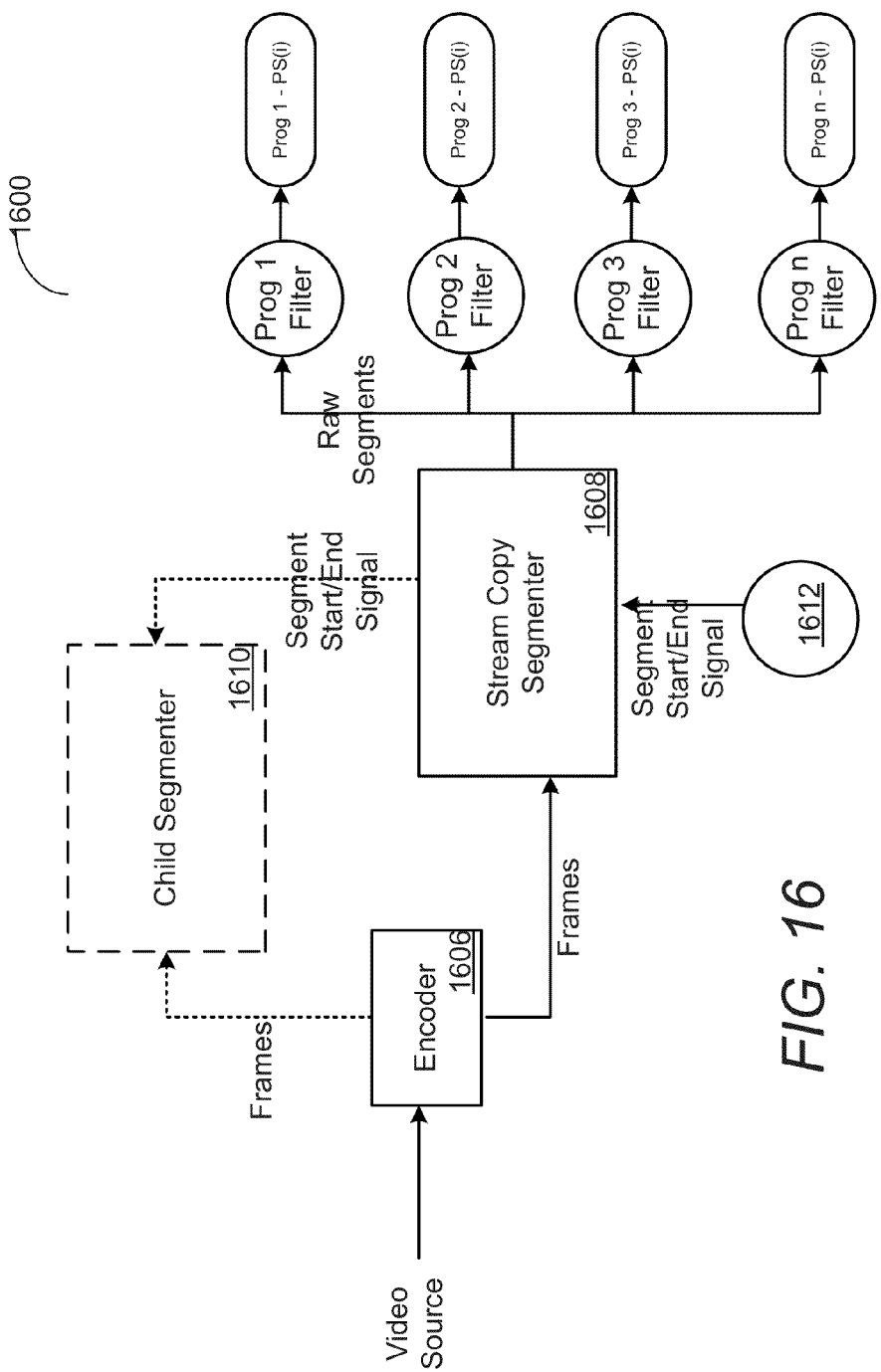
FIG. 16 is an illustration of a block diagram of a portion of a processing device pursuant to some embodiments.
Figure 17:
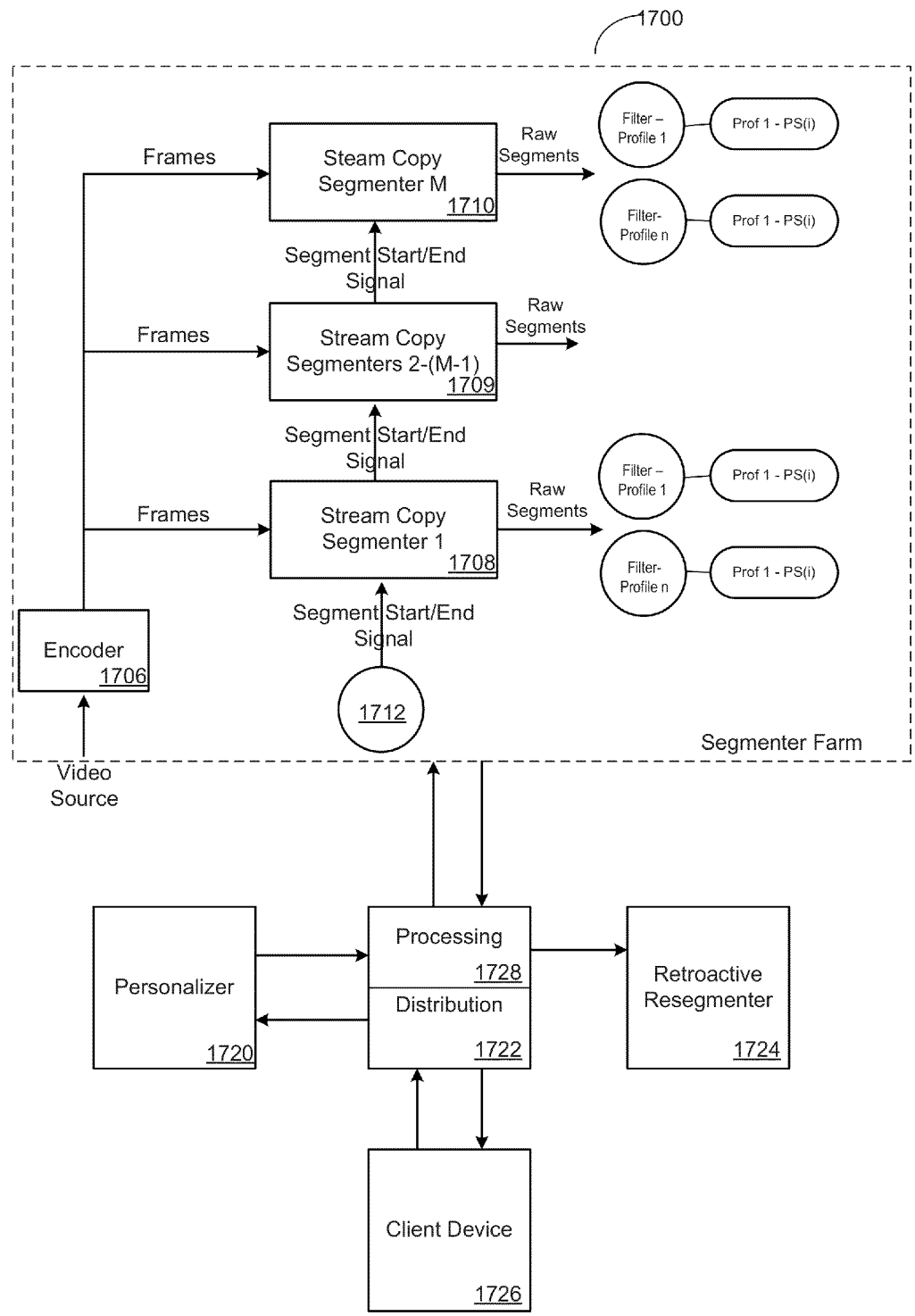
FIG. 17 is an illustration of a system pursuant to some embodiments.

Reference is now made to FIG. 16 where a portion of a processing device (such as the device 104 of FIG. 1) is shown which provides the ability to filter segments and produce multiple streams (e.g., using the filtering and instruction techniques combined with the segmentation strategies described above in conjunction with FIGS. 7 and 8). In particular, items 1606, 1608, 1610 and 1612 function substantially the same as the similarly depicted elements of FIG. 7; however, in FIG. 16, the concept of filters are shown with one or more programs created based on the application of the filters selected for each program stream. For example, program stream 1 has one filter applied, while program stream 2 may have a second filter applied, allowing multiple streams with multiple timing considerations and instructions applied. For example, as an illustrative but not limiting example, one filter may be applied based on a client device associated with a first user (who has selected to view a stream at a first point in time), while a second filter may be applied based on a second client device associated with a second user (who has selected to view the same stream or program at a second point in time). Each user wishes to view the same program, but because the two users start their viewing at different points in time, the sequence of segments (and the operations and instructions used to insert or recompute clocks) may be different for each of the two users.

A number of features described herein may be combined to provide a processing system which implements a number of the features of the various embodiments described herein. For example, referring now to FIG. 17, a system 1700 is shown which provides a mechanism and processing to subclip a segment on the fly (as described in FIGS. 1-4), as well as a mechanism and processing to control the size of segments during subclipping by caching more redundant streams or by resegmenting a larger set of video on the fly (as described in FIGS. 5-10) as well as mechanisms and processes to manage the stream clock for a particular connection (to allow dynamic ad insertion with respect to location and length) and for more personalized ad insertion as well as to allow the stream clock to be used by additional services (such as a game clock and score in sporting event broadcasts) (as described in FIGS. 11-16). For example, in the system 1700 of FIG. 17, a segmenter farm is provided which combines aspects of the systems of FIGS. 8 and 16 to generate multiple copies of streams (with filters applied on a profile basis). In some embodiments, in a media streaming solution where multiple bandwidths are supported and multiple copies of streams are recording, for smooth segmenting, it may be desirable to avoid creating extra copies of entire streams to support time coding for personalization. For example, in some embodiments, a segmenter farm may be provided in which only the first segmenter produces a stream for each profile (e.g., such as segmenter 1708).

Figure 18:
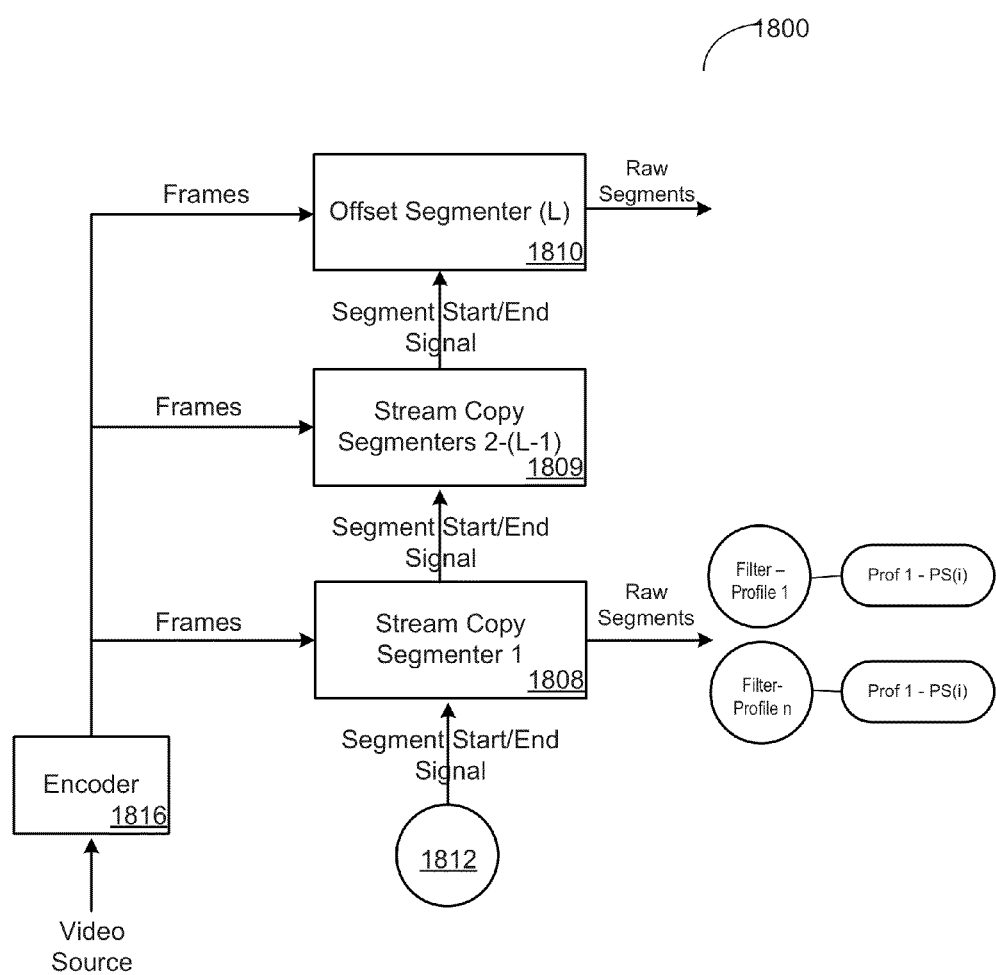
FIG. 18 is an illustration of a portion of a processing device pursuant to some embodiments.
Figure 19:
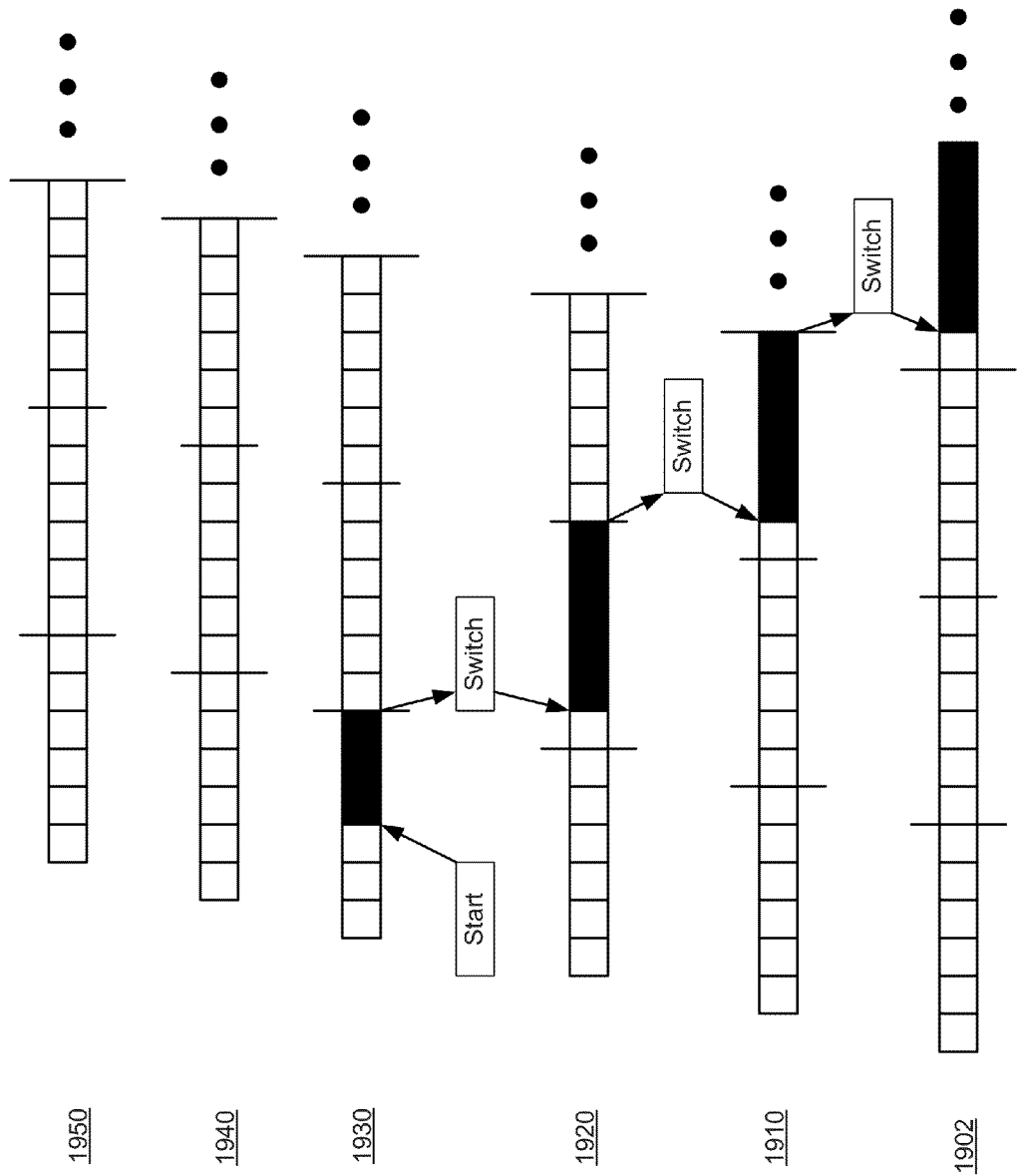
FIG. 19 is an illustration of streams processed pursuant to some embodiments such as the embodiment of FIG. 18.

Reference is now made to FIGS. 18 and 19 where a further embodiment of a portion of a processing device (shown in FIG. 18) and the resulting streams (shown in FIG. 19) are depicted. In the embodiment of FIGS. 18 and 19, a media streaming solution is depicted where multiple bandwidths are supported and multiple streams are generated for smooth segmenting as described elsewhere herein. However, in the embodiment of FIGS. 18 and 19, an approach is shown for use in situations where it is desirable to avoid creating extra copies of entire streams to support time coding for personalization. More particularly, as shown in FIG. 18, only a first segmenter 1808 is shown as producing a stream for each profile (shown as profiles 1–N).

To produce such a result, the processing system is operated to select a sequence of segments from the different stream copies 1902-1950 that overlap just enough so that: (1) each segment can be subclipped and filtered upon request, (2) each segment has minimal overlap with the previous and next segments, and (3) the last such segment is in the first stream (the stream produced by stream copy segmenter 1808). An illustrative example is depicted in FIG. 19 where it is shown that the selected sequence of segments begins with a segment in stream copy 1930 (which, according to some embodiments, was selected because the segment has minimal overlap with the previous and next segments). Only the selected portion of the first segment in stream copy 1930 is used before the processing system is operated to switch to the next stream (in stream 1920). This switching between segments continues until a segment in stream 1902 (the first stream produced by stream copy segmenter 1808) is selected. The stream 1902 continues as the selected stream until another subclipping event occurs. The result is a smooth stream, with large segments. Further, there is no need to maintain a large number of redundant copies of each stream.

Pursuant to some embodiments, such a sequence can be selected by the processing system by applying a formula or routine to identify the appropriate sequence. For example, for any timecode ("T"), a segment can be selected in which at least ("K") seconds of media is remaining. If the current segment in a stream copy (where the stream copy is some stream copy other than the first copy, such as streams 1910-1950 of FIG. 19), is stream copy "X", and if K is greater than M–K, the next segment from stream copy X–1 may be selected. If K is greater than M–K, the next segment is selected from stream X+1. If K is less than M–K and X is equal to M, then stream copy 1 should be selected. By applying such a routine or algorithm, the processing device may be operated to select a sequence of segments as illustrated in FIG. 19 using a processing device configured as shown in FIG. 18, reducing the number of redundant copies of each stream needed to produce a smooth stream for a given client device.

The processing device 104 of FIG. 1 (and other devices described herein) may be implemented in a number of ways. As a simple illustrative but not limiting example, the processing device 104 may be implemented as a server (or servers) based on one or more INTEL® Pentium® processors, coupled to communication devices configured to communicate with remote devices, for example, to receive a video feed and to output the segmented video feed and manifests.

A number of embodiments of the invention are disclosed herein. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, although specific hardware and data configurations have been described herein, note that any number of other configurations may be provided in accordance with embodiments of the present invention. Further note that embodiments may be associated with any number of different types of broadcast, video, or audio programs.

The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
receiving, by a stream processing device, an original content stream generated from an input video source, the original content stream having a plurality of segments each segment having a number of frames, the original content stream received without an advertisement;
identifying information associated with an advertisement for insertion into the original content stream at a predetermined point in time, the advertisement having a predetermined length and a plurality of segments, each segment having a number of frames;
updating, for each of the plurality of segments that follow the predetermined point in time of the original content stream, a program clock reference (PCR) of each of the plurality of segments by adding the predetermined length of the advertisement to the PCR of each of the plurality of segments;
identifying a starting one of the plurality of segments associated with the predetermined point in time of the original content stream and removing any frames of the starting one of the plurality of segments after the predetermined point in time of the original content stream;
calculating an ending point in time based on the predetermined time of the original content stream and the predetermined length of the advertisement;
identifying an ending one of the plurality of segments associated with the ending point in time and removing any frames of the ending one of the plurality of segments before the ending point in time; and
inserting the advertisement into the original content stream at the predetermined point in time of the original content stream to produce an updated content stream for delivery to a client device.

2. The method of claim 1, wherein the advertisement is inserted into the original content stream without a discontinuity between the original content stream and the advertisement.

3. The method of claim 1, further comprising:
delivering the updated content stream with the advertisement to at least a first client device as a continuous stream without a discontinuity.

4. The method of claim 1, wherein updating the PCR of each of the plurality of segments further comprises:
updating, for each of the plurality of segments that follow the predetermined point in time of the original content stream, a value of an original program clock reference (OPCR) to store an original value of PCR.

5. The method of claim 1, wherein the advertisement is an overlay, further comprising:

updating, for each of the plurality of segments of the advertisement, PCR data and OPCR data to equal the PCR data and the OPCR data of the content stream.

6. The method of claim 1, wherein the content stream is an HTTP live stream.

7. The method of claim 1, wherein the content stream is a previously encoded and stored content stream.

8. The method of claim 1, further comprising:
generating an index file identifying a sequence and location of the segments in the content stream including the advertisement for provision to a client device.

9. The method of claim 8, further comprising:
providing individual media files associated with the segments including the advertisement in known locations identified by the index file.

10. The method of claim 1, wherein the advertisement for insertion includes content including at least one of: (i) an advertisement, (ii) a score of an event, and (iii) other event information.

11. A method, comprising:
receiving, by a stream processing system, an original content stream generated from an input video source, the original content stream having a plurality of segments each having a number of frames and received without an advertisement;
generating at least a first copy of the original content stream, the at least first copy of the original content stream having a starting point delayed a first amount from a starting point of the original content stream;
identifying information associated with an advertisement for insertion into the original content stream at a predetermined insertion point in time and having a predetermined length, the advertisement having a plurality of segments each having a number of frames;
selecting one of the original content stream and the at least first copy of the original content stream as the active content stream;
identifying a starting one of the plurality of segments of the active content stream associated with the predetermined point in time of the active content stream and removing any frames of the starting one of the plurality of segments after the predetermined insertion point in time of the active content stream;
calculating an ending point in time based on the predetermined insertion point in time of the active content stream and the predetermined length;
identifying an ending one of the plurality of segments associated with the ending point in time and removing any frames of the ending one of the plurality of segments before the ending point in time; and
inserting the advertisement into the active content stream at the predetermined insertion point in time to produce an updated content stream for provision to a client device.

12. The method of claim 11, wherein the active content stream is selected based on the predetermined insertion point of time and a starting point of the original content stream.

13. A method, comprising:
receiving, by a processing device, an original content stream generated from an input video source, the original content stream having a plurality of segments each having a number of frames, the original content stream received without an advertisement;
generating a number of copies of the original content stream, each of the number of copies of the original content stream having a starting point delayed from a starting point of the original content stream, wherein the number of copies of the original content ("S") is determined based on the formula S=(M/(M−K)) where "M" is the length of each segment and "K" is a target minimum segment size, wherein the target minimum segment size is selected to ensure that no segment that has only a single frame is selected as the active segment;
identifying an advertisement for insertion into the original content stream at a predetermined insertion point in time associated with the original content stream and having a predetermined length, the advertisement having a plurality of segments each having a number of frames;
selecting one of (i) the original content stream and (ii) one of the number of copies of the original content stream as the active content stream; and
inserting the advertisement into the active content stream at the predetermined insertion point in time to produce an updated content stream for provision to a client device.

14. The method of claim 13, wherein the target minimum segment size and the length of each segment are determined based on information associated with the input video source.

* * * * *